Patented Aug. 30, 1932

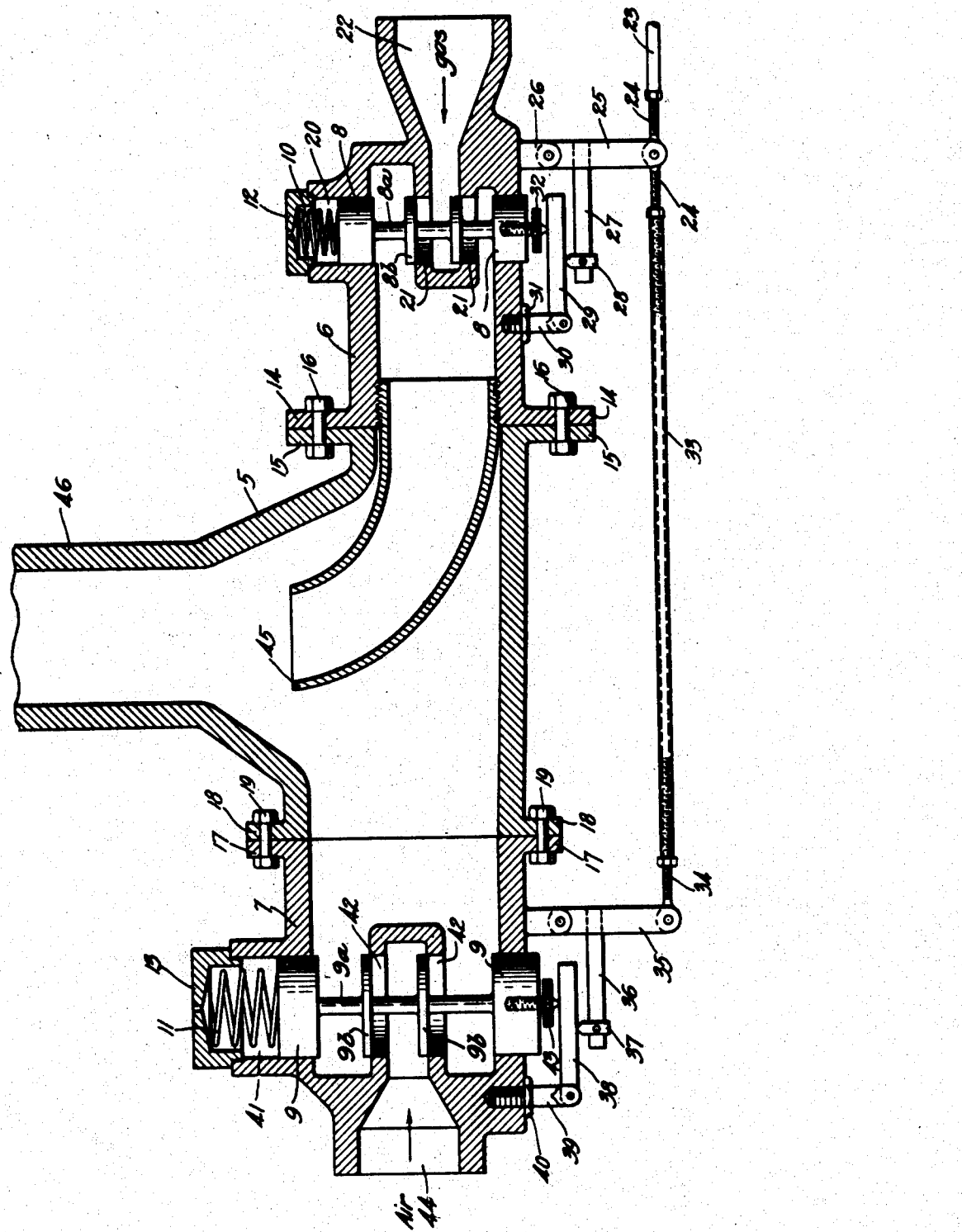

1,874,238

UNITED STATES PATENT OFFICE

VINCENT T. CALLAHAN, OF NORTH BERGEN, NEW JERSEY, ASSIGNOR TO BELL TELEPHONE LABORATORIES, INCORPORATED, OF NEW YORK, N. Y., A CORPORATION OF NEW YORK

FUEL CONTROL MECHANISM

Application filed December 28, 1927. Serial No. 243,016.

This invention relates to fuel control mechanisms for internal combustion engines and more particularly to fuel control mechanisms for internal combustion engines using artificial or manufactured gas for fuel.

An object of this invention is to adjust easily the air and gas intake valves of an internal combustion engine to supply the proper proportion of air and gas required for a correct fuel mixture under operating conditions where gas supply of different quality may be experienced at different locations.

Another object of this invention is to adjust closely the individual air and gas intake valves with the engine in operation to compensate for the varying gas quality and pressure experienced during a period of operation.

The valve control mechanisms supplied by the manufacturers of internal combustion engines using gas for fuel provide for regulation of the amount of gas entering the engine but do not provide for the close adjustment of air. Ordinarily natural gas is used at the factory to adjust the gas and air valves to obtain the correct amount of air and gas for a good mixture for satisfactory operation of the engine. When such engines are installed for operation with artificial gas, excessive backfiring of the engine sometimes occurs. This backfiring results at times in the breakage of engine parts and consequent danger to the operators.

The reason for the excessive backfiring is that the gas and air mixing valves are adjusted at the factory for natural gas which ordinarily requires substantially nine parts of air to one part of gas for a good mixture. Artificial gas on the other hand requires substantially four parts of air to one part of gas for a good mixture. When an engine which has been adjusted at the factory to operate on natural gas is supplied with artificial gas as a fuel, unless the adjustment is changed from a ratio of air to gas of approximately nine to one to an adjustment of approximately four to one, excessive backfiring results due to the fact that too great an amount of air enters the explosion chamber, the explosive mixture is therefore too thin, the explosion that takes place in the cylinder is delayed so that on the next opening of the intake valve a flame remains in the cylinder which prematurely sets off an explosion of the incoming gas. Due to the fact that artificial gas contains from 30 to 40% hydrogen such a premature explosion acts as a detonation and the forces developed exert so great a pressure that sometimes the manifold is broken into pieces which are thrown from the engine with high velocity resulting in great danger to the operators of the engine.

Another difficulty experienced in the operation of internal combustion engines on artificial gas is due to the quality and the pressure of artificial gas varying from time to time. The adjustment of the air throttle cannot therefore remain fixed and to obtain best results an air valve which moves and regulates the supply of air when the gas valve moves and regulates the supply of gas is needed.

According to this invention, a gas mixing valve and an air mixing valve are connected to a common governor control rod so that upon movement of the governor due to an increase or decrease in the speed of the engine both the gas and air valves move to keep the proportion of air to gas the proper one. Separate adjustments are provided for the air valve to permit the individual close adjustment of the air. Similar separate adjustments are provided for the close adjustment of the gas valve.

Referring now to the drawing, Fig. 1 is a sectional view of one embodiment of a fuel control mechanism constructed according to this invention.

5 is a mixing chamber into which gas enters through gas supply pipe 22 and air enters through air supply pipe 44. Gas valve 6 is bolted at flange portion 14 to flange 15 of chamber 5 by means of bolts 16. Similarly air valve 7 is bolted at flange portion 17 to flange portion 18 of chamber 5 by means of bolts 19. 23 is a governor rod which transmits forward or backward motion from a governor (not shown) when the speed of an engine with which the device is used increases above or decreases below a predetermined level. Governor rod 23 is adapted to screw on to bolt 24 in such a manner as to increase or decrease the effective length of the governor rod. The bolt 24 is pivotally attached to lever 25 which in turn is pivotally attached to extension 26 of valve 6. Lever arm 27 is supported at an angle of 90° from lever 25 and supports a fulcrum 28 which slides along the length of lever arm 27 and variably contacts with lever arm 29 which is pivotally supported by bolt 30. Bolt 30 is adapted to be screwed in or out of the wall of valve 6 so as to raise and lower lever 29, and is secured in the desired position by nut 31. A valve assembly having pistons 8 at opposite ends of a shaft 8a, one of which is slidable in cylinder 20, is reciprocally movable in valve chamber 6 to regulate the position of spaced valve caps 8b on the shaft which engage gas ports 21. The lower valve piston 8 contacts with lever 29 through adjusting screw 32 which screws in and out of the base of valve piston 8 to raise or lower the valve piston with respect to the lever 29. The upward motion of the valve piston 8 is opposed by spring member 10 which fits against the top of the valve piston and is secured within the top of the cylinder 20 by removable nut 12. 33 is a connecting rod which serves to transmit the motion of the governor rod 23 to the air valve assembly. Connecting rod 33 is screwed at one end to the opposite end of bolt 24 to that which is connected to governor rod 23 and screws at its other end on to bolt 34, which is pivotally secured to lever arm 35. Lever arm 36 is supported at an angle of 90° from lever 35 and supports fulcrum 37 which slides along the length of lever arm 36 and variably contacts with lever arm 38 which is pivotally supported by bolt 39. Bolt 39 is adapted to be screwed in or out of the wall of valve 7 so as to raise and lower lever 38 and is secured in the desired position by nut 40. A valve assembly having pistons 9 at opposite ends of a shaft 9a, one of which is slidable in cylinder 41, is reciprocally movable in valve chamber 7 to regulate the position of spaced valve caps 9b on a shaft which engage air ports 42. The lower valve piston 9 contacts with lever 38 through adjusting screw 43 which screws in and out of the base of the valve piston 9 to raise or lower the valve piston with respect to the lever 38. The upward motion of the valve piston 9 is opposed by spring member 11 which fits against the top of the valve and is secured within the top of cylinder 41, in which the valve piston moves, by the removable nut 13. 45 is a curved pipe which directs the flow of gas entering through valve 6 into pipe 46 which conveys the fuel mixture to the engine.

With the device in operation, if the speed of the engine, with which the device is used, decreases below a desired level, through the action, which is well known, of a governor, motion from the governor is transmitted through governor rod 23, in the direction of the device, to bolt 24 which being attached to lever 25 moves lever 25 to the left and causes fulcrum 28 to move arm 29 upwardly against adjusting screw 32 on valve piston 8 thus raising piston 8 in cylinder 20, thereby further opening gas ports 21 and permitting more gas to enter through gas inlet 22 into mixing chamber 5. The motion of the governor is transmitted simultaneously to air valve 7, through governor rod 23. Bolt 24, connecting rod 33, bolt 34, lever 35, lever 36, fulcrum 37, to lever 38 which contacts with adjustment screw 43 and lifts valve piston 9 and the valve caps 9b thereby permitting additional air to enter through air ports 42. As can be readily seen if the speed of the engine increases above the desired level the governor rod will move in a direction away from the device as shown by the drawing and will, through the movement of the levers above described, cause the valves to decrease the amount of air and gas permitted to reach the engine and thus decrease the speed of the engine to the desired point.

It was explained earlier in the specification that it is desirable to obtain a mixture of substantially four parts of air to one of gas for satisfactory operations with artificial gas as the fuel. Accordingly as shown by the drawing, the air valve is made much larger than the gas valve. The device can be closely adjusted to obtain the exact proportion of gas and air which are necessary for a correct mixture. If due to varying gas supply or for other reasons, the mixture becomes too rich or too thin the proportions of gas and air can be closely adjusted as follows: The height of the gas valve piston or the degree of opening of the gas ports with respect to the height of the air valve piston or the degree of opening of the air ports can be made greater by raising gas piston 8 with respect to lever 29 by screwing adjustment screw 32 out of the base of the valve piston and by screwing bolt 30 out of the wall of valve 6 to cause valve piston 8 to be lifted. By sliding fulcrum 28 along lever 27 further away from level 25, the movement of the gas valve piston with respect to the movement of the governor and the air valve piston can be made greater. The height of the gas valve piston with respect to the height of the air valve piston can be made less by screwing adjustment screw 32 further into the base of valve piston 8 and by screwing bolt 30 further in the wall of valve 6. By sliding fulcrum 28 nearer lever arm 25, the movement of the gas valve piston with respect to the movement of the governor and the air valve piston can be made less. The adjustment of air valve piston 9 with respect to the height of the gas valve piston and to the movement of the governor and the gas valve piston 8 is made in the same way, and through the use of the same cooperating elements as the adjustment of the gas valve explained above and since this can be easily understood by reference to the drawing, the detailed explanation for sake of brevity is omitted. The height of the gas valve piston with respect to the air valve piston can also be increased by detaching bolt 34 from lever 35 and screwing it further into connecting rod 33 and of course this relative height can be decreased by screwing bolt 34 out of rod 33. The simultaneous movement of both the gas and air valve pistons can be increased with respect to the movement of the governor by unscrewing governor rod 23 further from bolt 24 and of course this relative movement can be decreased by screwing governor rod 23 further on to bolt 24.

By means of the several adjustments described above, the exact proportions of air to gas suitable for efficient operation of a gas engine using artificial gas as the fuel are easily obtained, and by means of these same adjustments the fuel mixture can be adjusted during the operation of the engine to compensate for varying gas pressure or for different engine speeds.

What is claimed is:

1. A fuel control mechanism comprising a mixing chamber, a gas intake valve assembly in said chamber having piston terminations and a valve cap between said pistons, a governor rod for transmitting motion to said assembly, a lever for transmitting the motion of said governor rod to said assembly, an air intake valve connected with said chamber, having piston terminations and a valve cap between said pistons, a lever for transmitting motion to said air intake valve assembly, and a connecting rod for connecting said levers together so that the motion of said governor rod is transmitted simultaneously to both valve assemblies, said connecting rod being variable in length so that the degree of opening of one valve may be made greater than the degree of opening of the other valve.

2. A fuel control mechanism comprising a mixing chamber, an intake valve assembly in said chamber, a governor rod for transmitting motion to said assembly, a lever pivoted to said chamber and attached to said rod, a second lever attached to said first lever, and a third lever pivoted to said chamber, said third lever making contact with said second lever and said assembly.

3. A fuel control mechanism comprising a mixing chamber, an intake valve assembly in said chamber, a governor rod for transmitting motion to said assembly, a lever pivoted to said chamber and attached to said rod, a second lever attached to said first lever, a third lever pivoted to said chamber and making variable contact with said second lever, and an adjusting screw on said assembly for contacting with said third lever.

4. A fuel control mechanism comprising a mixing chamber, a fuel intake valve in said chamber, an air intake valve in said chamber, an individual lever for each valve, a governor rod, and a connecting rod joining said levers to said governor rod for transmitting motion from said governor rod simultaneously to both valves, said connecting rod being adjustable in length so that the degree of opening of said air valve may be made greater than said fuel valve.

5. A fuel control mechanism comprising a fuel intake manifold, a gas supply chamber and an air supply chamber connected to said manifold, an intake valve in each chamber, interconnected operating means to move said valves simultaneously, and means for independently adjusting either of said valves.

6. A fuel control mechanism comprising a fuel intake manifold, a gas supply chamber and an air supply chamber connected to said manifold, an intake valve in each chamber, inter-connected operating means for moving said valves simultaneously, means for individually adjusting each of said valves, and means connected with said inter-connected operating means for adjusting said valves in common.

In witness whereof, I hereunto subscribe my name this 21 day of December, A. D. 1927.

VINCENT T. CALLAHAN.